UNITED STATES PATENT OFFICE.

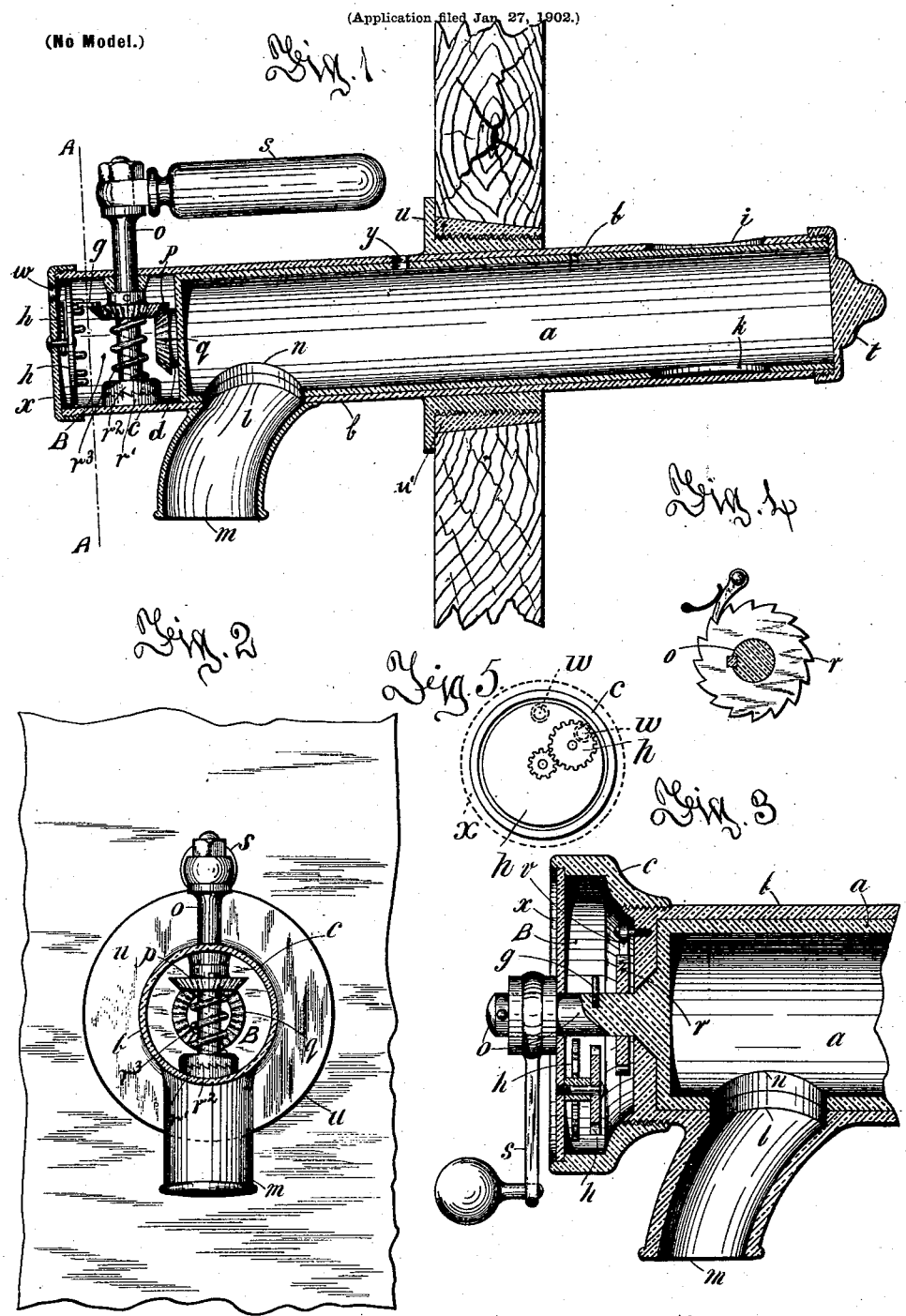

EBENEZER WILLIAM HUGHES AND LLEWELYN CAMPBELL, OF KENSINGTON, ENGLAND.

MEASURING AND REGISTERING COCK FOR LIQUIDS.

SPECIFICATION forming part of Letters Patent No. 697,844, dated April 15, 1902.

Application filed January 27, 1902. Serial No. 91,429. (No model.)

*To all whom it may concern:*

Be it known that we, EBENEZER WILLIAM HUGHES and LLEWELYN CAMPBELL, subjects of the King of Great Britain, residing at 18 Pitt street, Campden Hill, Kensington, in the county of Middlesex, England, have invented certain new and useful Improvements in Measuring and Registering Cocks for Liquids, of which the following is a specification.

Our invention relates to cocks by which liquids, such as spirits, are drawn off from casks or other reservoirs, the quantity drawn off at each operation being exactly measured and the number of operations registered and indicated; and the objects of our invention are to prevent any leakage in the apparatus and make its measurements absolutely accurate, to simplify its construction, to render it durable and inexpensive, and to reduce any liability to get out of order. We attain these objects by the mechanism illustrated in the accompanying drawings, in which—

Figure 1 is a longitudinal vertical section of the preferred form of our apparatus. Fig. 2 is a transverse section through the line A A in Fig. 1. Fig. 3 is a partial longitudinal vertical section illustrating a modification. Fig. 4 is a separate view of the ratchet-wheel and pawl shown in Fig. 3; and Fig. 5 is an end view of the form shown in Fig. 1, the front part of the cylinder being shown in dotted lines.

Similar letters refer to similar parts throughout the several views.

Referring to the figures, $a$ is a cylindrical tube of such length and diameter as to exactly contain the quantity of spirit or other liquid to be measured and drawn off.

$b$ is an outer tube, into which the tube $a$ fits freely, but water-tight.

$c$ is an extension of the front end of the outer tube $b$, forming a chamber B to contain the spindle $d$ for rotating the inner tube $a$ and the counting and registering device consisting of a pin $g$ and counting-wheels $h$.

$w$ $w$ are openings in the front $x$ of the cylinder, through which may be seen the registering-wheels $h$.

$i$ is an elliptical inlet-hole at the top of the outer tube $b$, and $k$ is a corresponding hole in the inner tube $a$.

$l$ is an outlet-hole at the bottom of the outer tube $b$, communicating with a discharge-spout $m$, and $n$ is a similar corresponding hole in the inner tube $a$. The holes $k$ and $n$ are on the same side of the tube $a$.

A spindle $o$ turns in bearings in the chamber B of the tube $b$ and rotates the inner tube $a$ by a beveled toothed wheel $p$ upon the spindle $o$ gearing with a beveled toothed wheel $q$ upon the closed front end of the tube $a$. The spindle $o$ is prevented from rotating backward by the toothed clutches $r'$ $r^2$, the clutch $r'$ being secured to the casing B and the clutch $r^2$ being carried by and longitudinally movable on the spindle $o$. The clutch $r^2$ is held in mesh with the clutch $r'$ by the coil-spring $r^3$.

$s$ is a handle upon the spindle $o$, by which the latter is turned and the tube $a$ rotated.

$t$ is a screw-cap closing the back end of the tube $b$, which is situated in the vessel from which the liquor is to be drawn.

$u$ is a flanged screwed socket screwed into the conical-shaped interiorly-screw-threaded nipple $u'$, fitted in front of the said vessel, the tube $b$ being fixed in the socket $u$ in a somewhat-inclined position, so that when screwed in its place the outer end of the cock is somewhat lower than its inner end, which is in the vessel, as shown in Fig. 1.

In Figs. 3 and 4 the spindle $o$ is formed upon the front end of the inner tube $a$ and passes through the front closed end of the outer tube $b$, to which the spring-pawl $v$ is fixed, which engages with the ratchet-wheel $r$ upon the spindle $o$. In this modification the chamber B, containing the spindle $o$ and the counting and registering devices $g$ and $h$, is shown made separate and screwed upon the end of the tube $b$.

The figures shown by the several counting-wheels are seen through openings, such as $w$, in the front $x$ of the chamber B.

At $y$, Fig. 1, small holes are shown through both the tubes $a$ and $b$ to admit air when the liquor is being discharged through the spout $m$. These holes only coincide when the inner tube is in the position for discharging, as shown.

The inlet and outlet holes through the tubes $a$ and $b$ are so placed that when the inlet is opened the outlet is closed, and vice versa, which is effected by the rotary motion of the inner tube by means of the handle $s$, which is turned continuously, as required, but always in the same direction. At each revolution of the handle the inner tube first becomes filled with the exactly-determined quantity of liquor, which is afterward discharged through the spout $s$ into any vessel placed to receive it, and at the same time the number of revolutions, and consequently the quantity of liquor withdrawn, is accurately counted and registered by a counting device of the well-known kind and operated by the movement of the handle.

As the liquor does not reach the mechanism, any sediment therefrom will not clog the latter or impede the movement of the tube.

The apparatus is simple in construction and easily taken apart for cleaning and may be used for thick liquids as well as for thin ones.

We are aware that prior to our invention cocks have been made by which liquor is approximately measured as well as drawn off, and we do not claim such an arrangement broadly; but

What we claim as our invention, and desire to secure by Letters Patent, is—

1. In a registering-faucet, the combination with a cylinder closed at one end, a second longer cylinder closed at its rear end, surrounding and forming a projecting chamber opposite the closed end of said first cylinder, and mechanism contained in and incased by said chamber for operating said inner cylinder and registering each rotation of the same.

2. In a registering-faucet the combination with a cylinder closed at one end, a second longer cylinder closed at its rear end, surrounding and forming a projecting chamber opposite the closed end of said first cylinder, a bevel gear-wheel mounted on said inner cylinder, a shaft journaled transversely of said chamber, a bevel gear-wheel mounted on said shaft in engagement with said first bevel gear-wheel, a registering-wheel rotatably mounted in said chamber, means carried by said shaft for operating said wheel, means for rotating said shaft, and means for preventing the backward rotation of same.

3. In a registering-faucet, the combination with a cylinder closed at one end, a second longer cylinder closed at its rear end, surrounding and forming a projecting chamber opposite the closed end of said first cylinder, a bevel gear-wheel mounted on said inner cylinder, a shaft journaled transversely of said chamber, a bevel gear-wheel mounted on said shaft in engagement with said first bevel gear-wheel, a registering-wheel rotatably mounted in said chamber provided with a plurality of laterally-projecting lugs, a lug carried by said shaft for successively engaging said plurality of lugs, means for rotating said shaft, and means for preventing the backward rotation of said shaft.

In witness whereof we have hereunto set our hands in the presence of two witnesses

EBENEZER WILLIAM HUGHES.
LLEWELYN CAMPBELL.

Witnesses:
ARTHUR E. EDWARDS,
ALFRED E. BRATTON.